United States Patent [19]
Condon

[11] 3,760,103
[45] Sept. 18, 1973

[54] BIDIRECTIONAL STORAGE CROSSPOINT MATRICES FOR MIRROR IMAGE TIME DIVISION SWITCHING SYSTEMS

[75] Inventor: Joseph Henry Condon, Summit, N.J.

[73] Assignee: Bell Telephone Laboratories, Incorporated, Murray Hill, N.J.

[22] Filed: Dec. 2, 1971

[21] Appl. No.: 204,013

[52] U.S. Cl. .......... 179/15 AQ
[51] Int. Cl. .......... H04j 3/16
[58] Field of Search .......... 179/15 AQ

[56] References Cited
UNITED STATES PATENTS 3,674,938 7/1972 Jacob .......... 179/15 AQ

*Primary Examiner*—Ralph D. Blakeslee
*Attorney*—W. L. Keefauver et al.

[57] ABSTRACT

Two orthogonally oriented sets of matrix coordinate circuit sets are arranged in bidirectional signal transmission pairs within their respective circuit sets. Respective circuit pairs in the two sets are coupled together at matrix crosspoints by signal storage registers that are operated by clock-driven control memories. Those memories determine both the distribution of input signals from one set of coordinate circuits to crosspoint-coupling storage registers for circuits of the other set and the sequence for collecting crosspoint-stored signals onto circuits of the latter set. The bidirectional crosspoint matrices are utilized in mirror image switching networks for communication systems.

15 Claims, 4 Drawing Figures

BIDIRECTIONAL STORAGE CROSSPOINT MATRICES FOR MIRROR IMAGE TIME DIVISION SWITCHING SYSTEMS

BACKGROUND OF THE INVENTION

1. Field of the Invention

This invention relates to signal switching systems in which the switching devices are crosspoint matrix arrays having signal storage functions at each matrix crosspoint.

2. Description of the Prior Art

Time division switching systems which have signal storage functions at switching matrix crosspoints are known, as illustrated for example by the M. J. Marcus U.S. Pat. No. 3,573,381. It is also known in the art to arrange multistage switching networks in a tandem fashion with time slot interchanging capability at the electrical center of the network where signal information is relatively concentrated. One example of such a switching arrangement, sometimes called a mirror image network, in which a single control memory output influences the operation of corresponding matrix crosspoints in opposite halves of the network, is shown, for example, in the H. Inose-T. Saito U.S. Pat. No. 3,461,242. However, the utilization of the Marcus type of storage crosspoint circuit in the mirror image type of switching network involves some departure from the pure mirror image configuration. The Marcus type of network depends upon the counting of input signal bits at each crosspoint in order to control crosspoint readout, and the necessary count information for the mirror image part of the network is not readily available at the proper time for setting up call connections through the network. Similarly, a mirror image type of control is not available because such control would cause the switch selection to propagate in the opposite direction from data propagation in one half of the network.

It is, therefore, one object of the invention to improve storage crosspoint switching networks.

It is another object to facilitate the use of storage crosspoint switching networks in mirror image types of switching systems.

A further object is to reduce the dependence of storage crosspoint switching matrices upon the orientation of the matrix with respect to the direction of signal flow through a switching network.

SUMMARY OF THE INVENTION

The foregoing objects of the invention are realized in an illustrative embodiment in a time division multiplex communication system wherein a storage crosspoint switching network includes at each crosspoint separate shift registers for receiving input signals for each direction of transmission and additional registers for providing output signals for each direction of transmission. The operations of the respective registers are coordinated by output signals from a pair of control memories which also control corresponding registers in the crosspoints coupled to the same row and column of the matrix. One such memory controls both the input register for one direction of transmission and the output register for the other direction of transmission while the other memory controls both the input register for the second direction of transmission and the output register for the first direction of transmission. At the end of each time frame, the contents of the input registers are transferred to the output registers.

It is one feature of the invention that a plurality of bidirectional crosspoint circuits and their associated matrix coordinate circuit interconnections are advantageously formed on a single semiconductor integrated circuit chip.

It is another feature that the foregoing shift register arrangements constitute dual unidirectional switching matrices which cooperate to make up a bidirectional matrix, and the bidirectional matrix performs the switching functions of corresponding switching stages in opposite halves of a mirror image switching network. Thus, a single control memory influencing signal coupling along a particular bidirectional matrix coordinate circuit pair controls corresponding switching functions in both halves of the mirror image network.

A further feature is that the use of control memories instead of counters for coordinating both the input and the output functions of a storage crosspoint matrix results in lower cost circuits because of the much simpler circuit connections and control required for control memories as compared to counters.

A still further feature of the invention resides in a pathfinding routine for locating available connection equipment in a network of bidirectional, storage, switching matrices and wherein the routine causes "no operation" (NOP) codes to be stored in control memory locations for equipment found to be available and in order to reserve such availability until a complete connection path is determined to be available.

BRIEF DESCRIPTION OF THE DRAWINGS

A more complete understanding of the present invention and its various features, objects, and advantages may be obtained upon a consideration of the following detailed description in connection with the appended claims and the attached drawings in which:

DETAILED DESCRIPTION

Figure 1:
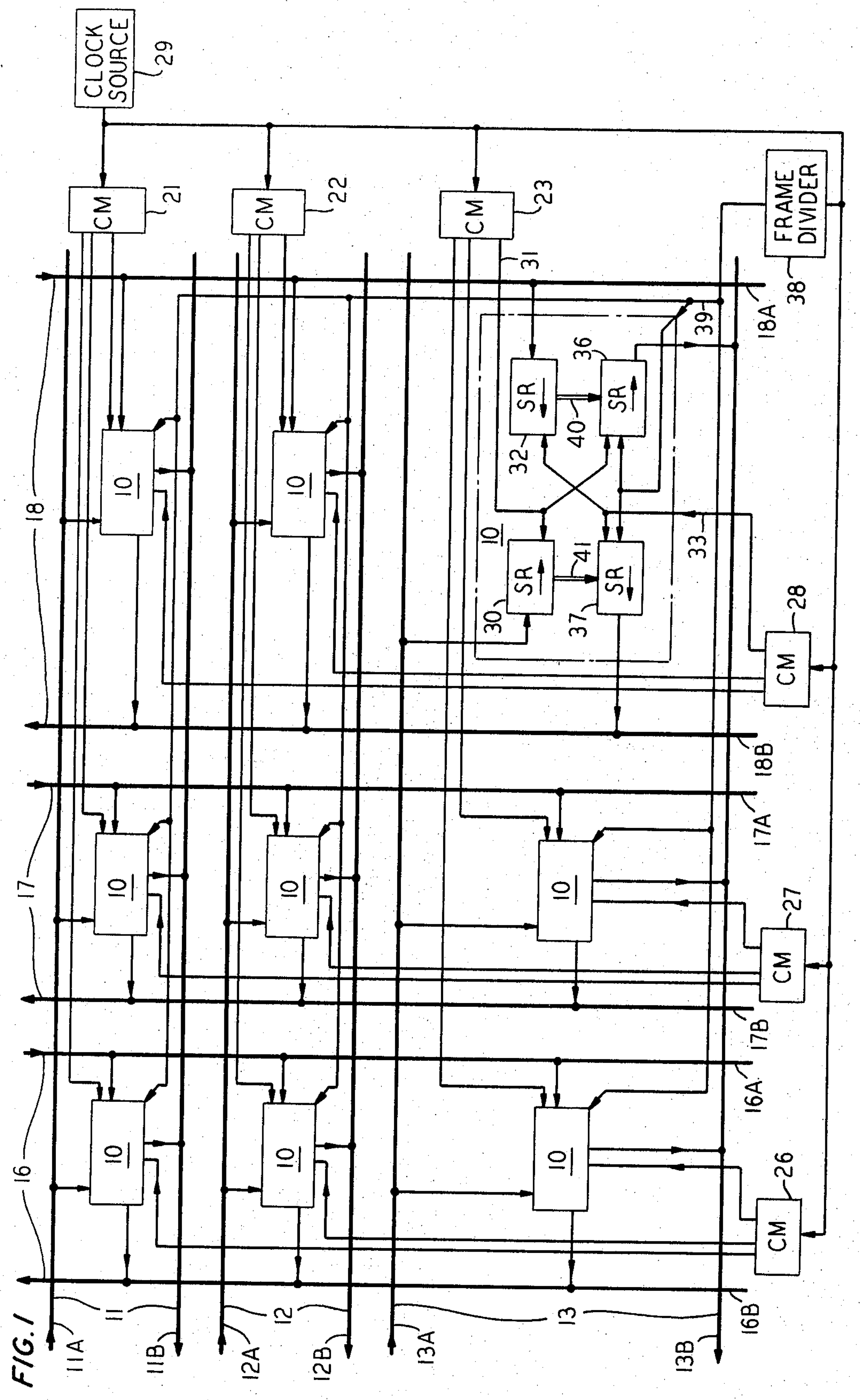
FIG. 1 is a simplified block and a line diagram of a storage crosspoint switching matrix in accordance with present invention.

In the storage crosspoint switching matrix of FIG. 1, nine storage crosspoint circuits 10 interconnect two orthogonally oriented sets of matrix coordinate circuits. One set includes the row, or horizontal, coordinate circuits 11, 12, and 13, while the second set includes the column, or vertical, coordinate circuits 16, 17, and 18. Each of the coordinate circuits just indicated includes a pair of coordinate circuit conductors for accommodating bidirectional signal transmission. Thus, for example, the row circuit 11 includes conductors 11A and 11B for respectively supplying signals to the matrix and providing output signals from the matrix. The other coordinate circuits of the matrix include similar designated conductor pairs with like functions. Thus, the bidirectional matrix illustrated in FIG. 1 is actually a dual matrix including a pair of associated unidirectional matrices for accommodating opposite directions of signal transmission. Although only a 3 × 3 matrix array is illustrated in FIG. 1 for convenience of presenting the principles of the present invention, it is to be understood that those principles are applicable to arrays of other sizes and to arrays with unequal numbers of row and column circuits. The latter allow concentration and expansion as taught by Marcus.

Three control memories 21, 22, and 23 are provided for coordinating the operations of those crosspoint circuits 10 which are coupled to the row coordinate circuits 11, 12, and 13, respectively. Similarly, three additional control memories 26, 27, and 28 are provided for coordinating the operations of the corsspoint circuits 10 which are coupled to column coordinate circuits 16, 17, and 18, respectively. All of the matrix control memories are supplied with clock signals from a clock source 29 which schematically represents a central control, not otherwise separately shown, for the illustrated matrix and for the network in which the matrix is included. Sych a central control for switching arrangements is now well known in the art and comprises no part of the present invention. Briefly, however, a central control includes memory and a stored program controlled data processor for executing arithmetic and logic operations on signal representations supplied from memory and/or from input/output equipment, such as that presented herein, that is in communication with the processor. Similarly, clocked control memory arrangements for controlling different portions of time division multiplex communication apparatus as directed by a central control are also well known in the art and are not treated here in full detail.

It is sufficient here to indicate that each of the illustrated control memories includes a word storage location corresponding to each of the time slots in a current time frame utilized for organizing time division multiplex signal transmission. Clock pulses provided from the source 29 at the time slot repetition rate are utilized to cause, e.g., by driving a binary counter to produce sequential address signals, the respective control memories to read out in sequence, and in phase with all of the other control memories, the contents of their respective time slot word locations. The latter locations have stored therein signal representations of equipment-controlling codes. Decoders included in the respective control memories derive from those stored representations one-out-of-*n* type of signal representations which are applied to the respective equipments represented thereby. In FIG. 1, the control memory outputs are utilized as shift commands for shift registers in the respective bidirectional crosspoint circuits 10 in a manner which will be subsequently described. It should be apparent, however, that any shift command is steered by the decoder of its control memory to a selected one of the crosspoint circuits connected to the coordinate circuit conductor pair with which the control memory is associated.

All of the crosspoint circuits 10 are of the same type and accordingly only the crosspoint circuit for the lower right-hand crosspoint of the matrix in FIG. 1 is illustrated in detail. Within the latter crosspoint circuit, four unidirectional shift registers are provided. Each register is of any of the well-known types which respond to shift commands applied to a shift input connection thereof for entering data signals recieved at a data input connection for the register and for advancing those signals through the register in successive steps corresponding to the successive shift commands applied to the register.

In FIG. 1, a shift register 30 receives data input signals from coordinate circuit conductor 13A and advances those signals through the register in response to shift commands applied from control memory 23 on a conductor 31. A similar shift register 32 receives data input signals from the coordinate circuit conductor 18A and shifts those signals through the register in response to shift commands from the control memory 28 on a shift command conductor 33. At the same time that the foregoing data input and shifting operations are taking place, the shift commands on conductors 31 and 33 are utilized for similarly actuating two output shift registers 36 and 37 for supplying data signals to coordinate circuit conductors 13B and 18B respectively. At the end of each time frame, a frame frequency divider 38, which has also been receiving clock pulses from the source 29, produces an output pulse on a conductor 39 which has branch conductors extending to each of the crosspoint circuits 10. The latter conductors extend an end-of-frame signal to output shift registers 36 and 37 in all crosspoint circuits for enabling bit-parallel input gates (not separately shown) in each of those registers for coupling into such registers the contents of the input registers 32 and 30, respectively, by way of bit-parallel coupling circuits 40 and 41, respectively.

Shift registers 30, 32, 36, and 37 are each advantageously sixteen time slot signal stages in length for a 6 × 6 matrix in a system having 64 time slots per frame. Along any matrix coordinate there is thus a frame and a half of time slot signal storage capacity.

Considering now the overall operation of the matrix in FIG. 1, it will be seen that the time slot input signals on each of the row coordinate conductors are distributed to the respective crosspoint circuits 10 which are coupled to that row circuit, e.g., circuit 13. Such distribution is controlled by the output signals from the control memory 23 which thereby fix the matrix output conductor path that will be followed by the data signals during a subsequent time frame.

At the end of each time frame, the frame signal on circuit 39 causes the contents of all of the input shift register 30 to be transferred, i.e., jammed across, in bit-parallel fashion to the output shift registers 37 of the same crosspoint circuits. In the subsequent time frame, the time slot data bits are shifted out onto the associated column circuit conductors, e.g., conductor 18B, in whatever sequence is directed by the output signals from control memory 28. Thus, that memory controls the sequence in which time slot data signals are collected onto the conductor 18B from the various output shift registers 37 which are coupled to output column 18. However, within a particular cross-point circuit, the input and output registers are advantageously arranged so that the last-in signals are also the first-out signals.

It should now be appreciated that the word locations of a row control memory, such as memory 23, correspond to respective time slots of a time frame, and each contains the number of a crosspoint circuit along the corresponding row circuit 13 that is to be coupled to the row circuit in that time slot of each frame. Of course, if no such input coupling is to be provided in that time slot, the word location contains a NOP code binary representation, as will be subsequently discussed in greater detail. In each column memory, the word locations are advantageously utilized in such a manner as to cause the locations utilized for activating coupling between crosspoint circuits and the column circuit to be those read out earliest in each frame and any unused locations to be those read out in the later part of each frame. It will be shown that the column control memory contents are written in a way which causes the output on the associated column circuit in successive time slots to depend in part upon the order in which time slot signals are received from any particular row circuit and in part upon the order in which calls are set up which require the use of such column control memory.

At the same time that the foregoing operations are taking place with respect to data signals moving from row conductors through crosspoint circuits to column conductors, similar signal coupling is taking place in the reverse direction, e.g., from column conductors 18A through shift registers 32 and 36 to row conductor 13B. The similarity of coupling results from the fact that registers 36 and 32 are slaved by the control memory outputs to registers 30 and 37, respectively. A pathfinding technique for determining information to be stored in the control memories for an illustrative switching network using matrices of the type shown in FIG. 1 will subsequently be considered.

Figures 2, 2A:
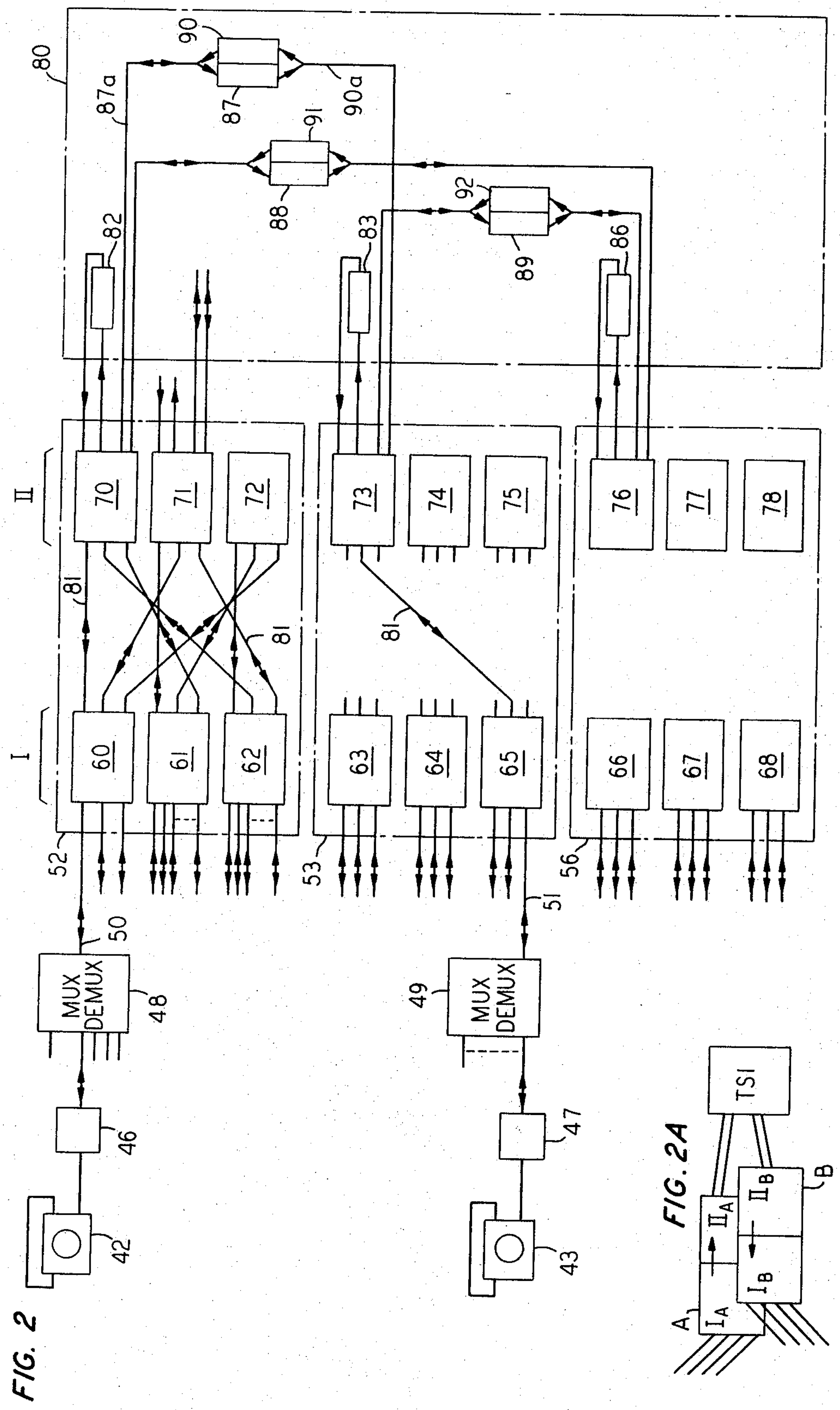
FIG. 2 is a simplified block and line diagram of a mirror image switching network utilizing crosspoint matrices of the type shown in FIG. 1.
FIG. 2A is a simplified schematic representation of the network of FIG. 2.

In FIG. 2, there is shown a partial diagrammatic representation of a communication system utilizing a mirror image switching network that advantageously employs bidirectional storage cross point switching matrices of the type shown in FIG. 1. Only the principal call connection functions need be here considered in order to demonstrate the structure, operation, and utility of the present invention. Many of the lines shown in the drawing to represent circuits interconnecting the various circuit block schematic representations are bidirectional communication paths such as, for example, the bidirectional row circuit 11 in FIG. 1. This bidirectional characteristic is indicated schematically in FIG. 2 by the employment of oppositely directed arrowheads on such bidirectional circuits, i.e., circuits which include separate conductors dedicated to conduction in opposite directions. In like manner, circuit line representations in FIG. 2 and which conduct exclusively in one direction are so indicated by a single arrowhead in the direction of the communication. Circuit lines having bidirectional signal transmission over a single line at different times are simply illustrated as a line without arrowheads.

Subscriber stations between which communication can take place through the illustrated network are illustratively indicated at the left-hand side of FIG. 2 by two telephone sets 42 and 43 which are coupled through line units 46 and 47, respectively, to individual input connections on multiplexers 48 and 49 for performing multiplexing and demultiplexing functions. Other types of subscriber stations can, of course, be employed. The line units 46 and 47 advantageously perform coding and decoding functions to place the analog signals from telephones 42 and 43 in a convenient digital form such as that employed in differential pulse code modulation systems. Multiplexers 48 and 49 combine signals from various subscriber stations into a time division multiplex form on time division multiplex highways, such as the highways 50 and 51, for coupling the signals to the switching network, which will be described.

The switching network of FIG. 2 includes in the schematic representation shown two switching stages I and II. Each stage includes storage crosspoint matrices arranged in three groups 52, 53, and 56; and each such group includes within a stage three of the mentioned matrices. Thus, the stage I includes matrices 60, 61, and 62 in group 52; 63, 64, and 65 in group 53; and 66, 67, and 68 in group 56. Similarly, the stage II includes similarly grouped matrices 70 through 78.

Each of the matrix blocks in FIG. 2 has matrix row coordinate circuits indicated by lines extending from the left-hand side of the block and column coordinate circuits indicated by lines extending from the right-hand side of the block. Any of the stage I matrices (60–68) may be 3 × 3 or 6 × 3 or 12 × 3 matrices in order that concentration and expansion functions may be carried out advantageously by the switching network. Such concentration and expansion functions are known in the art to be within the capabilities of storage crosspoint switching matrices and may be used, for example, for connecting switching matrices and may be used, for example, for connecting subscriber stations directly to the network or for accomplishing connections from other switching networks or offices.

Since the network stage I includes matrices of the type shown in FIG. 1, the stage is really a bidirectional switching network stage which combines within one matrix the switching functions of the first and last stages of what might otherwise be considered a unidirectional network. In the network specifically illustrated in FIG. 2, the bidirectional stage I includes the switching functions of the first and fourth stages of a unidirectional network. The concept of a single bidirectional switching stage performing the functions of two unidirectional stages may perhaps be better visualized by reference to FIG. 2A where two planes A and B represent schematically two undirectional network parts for transmission in opposite directions. Each part includes two stages, e.g., $I_A$ and $II_A$ in plane A, and $I_B$ and $II_B$ in plane B.

Stage II of the network in FIG. 2 employs storage crosspoint matrices which are all of the 3 × 3 size. This stage performs signal coupling and switching functions between the stage I and a time slot interchanger 80. Thus, the stage II actually performs the functions of the second and third unidirectional stages of the four-stage switching operation depicted in FIG. 2. Bidirectional link circuits 81 interconnect the column circuits for each stage I matrix to a corresponding row circuit of each stage II matrix within the same matrix grouping. For example, column circuits 16, 17, and 18 of matrix 60 are link-connected to row circuits 11 in matrix 70, 12 in 71, and 13 in 72. The complete link connection pattern is illustrated for the group 52, and the same pattern of bidirectional links should be understood to be included in groups 53 and 56 although not specifically completely there shown. Other known types of link connection patterns may, of course, be employed and would, in fact, be advantageous for applications wherein larger numbers of matrices are employed in each matrix group of the network.

Time slot interchanger 80 provides the time slot transposition function between the two halves of the mirror image switching network, and it also performs the intergroup coupling function for the network. Although storage matrices of the type described in connection with FIG. 1 do perform a type of time slot shifting function, they generally are primarily adapted for performing the switching connection function. Consequently, the time slot interchangig function for subscribers utilizing different time slots is generally not accommodated.

Within time slot interchanger 80, each stage II column circuit is coupled through time slot interchanging units of the type illustrated in the aforementioned Inose et al. patent to the return conductor, e.g., 16A, in the same column circuit of the same matrix or to a corresponding column circuit conductor of a corresponding stage II matrix in each of the other matrix groups. The time slot interchange 80 includes a time slot interchanging unit 82 which interconnects the output and input conductors of a column circuit, e.g., column circuit 16, in the matrix 70. Time slot interchanging units 83 and 86 perform a similar function for matrices 73 and 86, and other interchanging units (not shown) are similarly connected with respect to the other matrices in stage II. Each of these unidirectional interchanging units, such as 82, is advantageously of the type taught by Inose et al. and includes a shift register having a single input connection to the first shift register stage and having control-memory-selected output taps from different register stages to provide delayed outputs which are ORed to a common output circuit. The control memory, called a "junctor control" by Inose et al., directs which output tap will be used for any time slot signal and, thus, the amount of time slot delay incurred by the time slot transposition accomplished thereby. Control memories for interchanging units are not specifically shown in FIG. 2 because they are known in the art and are considered to be included within the schematic representation of the units.

Similar undirectional time slot interchanging units 87 and 88 are included in the output conductors 17B and 18B for matrix 70 column circuits 17 and 18. Units 87 and 88 have their outputs coupled to corresponding input conductors 17A and 18A in the matrices 73 and 76 in group 53 and the group 56, respectively. Likewise, another such unit 89 provides the time slot interchange coupling between the output conductor 17B of matrix 73 in group 53 and the input conductor 17A of matrix 76 in group 56. Similar time slot interchanging units 90, 91, and 92 are associated with the units 87 through 89, respectively, for providing the reverse direction of signal transmission among the matrices 70, 73, and 76 of groups 52, 53, and 56. However, the units 90 through 92 are inverted in that time slot signals on their input connections are steered by interchanger control memory output signals to inputs of different shift register stages depending upon the degree of time slot delay that is desired to complement delay for the opposite transmission direction. Each bidirectional time slot interchanging unit pair, e.g., 87,90, is controlled by a single control memory. The three units 90–92 each uses a single output connection, from its final register stage, to the input conductors 17A, 18A and 17A of their respective matrices. Although not specifically shown, it is to be understood that time slot interchanger 80 includes other time slot interchanging unit pairs, such as the unit pair 87,90, for providing, in a similar manner, time slot interchanging coupling between column circuits of each matrix and corresponding column circuits in corresponding matrices of each of the other matrix groups.

Turning now to the project of establishing call connections through the network of FIG. 2, the pathfinding algorithm will be considered. One technique that is employed is to choose a space division path for one direction of transmission through the network, determine the availability of switching equipment and time slots in one of those possible paths, reserve that availability, and then write into the appropriate control memories of the network the names of equipments which are to be activated in the appropriate time slots. These steps are hereafter discussed in somewhat greater detail.

Central control processing equipment (not shown) determines time division highway numbers for calling and called stations at the row circuit interface for stage I matrices in the usual manner for stored program controlled switching systems. In like manner, the time slots utilized by those stations at that interface, e.g., on highways 50 and 51, are also determined by the central control. Knowing this much information, there are then a limited number of space division paths that can be utilized. For purposes of illustration, a path will be determined for establsihing a connection between the multiplexers 48 and 49 for the telephone sets 42 and 43. This requires a connection through the network between different groups of matrices, but it will be apparent from the description that similar techniques for pathfinding are also utilized for establishing connections between subscribers that are served by the same group of matrices or even by the same stage I matrix.

The telephone set 42 necessarily utilizes time division highway 50 and matrix 60. Connection to row coordinate circuit 11 is indicated. Within that matrix, any of the three column coordinate circuits can be utilized, and whichever one is selected imposes the requirement that a certain stage II matrix within the same matrix group 52 be employed. Likewise, the stage II matrix has available to it only one time slot interchanging path for reaching the matrix group 53 to make connection to time division highway 51 and subscriber set 43. There are, thus, three space division paths that can be utilized for establishing the connection between stations represented by sets 42 and 43. Undue blocking is avoided because of the flexibility of the use of time division in the space division paths.

The three possible space division paths are identified in terms of the number of the matrix 60 column coordinate circuit used. Coordinate circuit numbers, and intercoupling crosspoint circuit numbers, in each matrix and time slot interchanging unit numbers have now been determined for a first one of the possible space division paths. Similar information for the other paths is derived from that which is determined for the first path. Equipment numbers determined are retained in central control temporary memory for subsequent use in execution of the pathfinding and call connection routines. The equipment number determinations are advantageously made by program in accordance with the method utilized, for example, in the path determinations described in the copending application of D. W. Hagelbarger, Ser. No. 150,138, filed June 4, 1971, and assigned to the same assignee as the present application. The aforementioned application now U.S. Pat. No. 3,701,112 is entitled "Balanced, Incomplete, Block Designs for Circuit Links Interconnecting Switching Network Stages." Having determined the equipment designations for the possible space division paths, each of these paths is examined in succession to identify appropriate time slots until a complete, unblocked, time and space division path between telephone sets for the call is found.

An equipment-time availability determination is made advantageously by program, although programmed logic circuits may also be employed. The technique utilized is to examine control memories for time slot availability in successive steps through the network and reserve available time slots as they are located. Such reservation is accomplished by writing into the appropriate control memory word location a "no-operation" (NOP) code which is retained until a complete space and time path is determined. Note that an unused time slot word location normally contains an all-ZEROS binary code representation, a reserved location contains a NOP code of the same form, and other locations contain binary coded equipment number representations. The use of the term "NOP code" simply facilitates consideration of the path search and connection operations. After complete path availability has been determined, the appropriate equipment designators identified for the space division path at the outset are written into the various control memory word locations in the reserved time slots to complete the call connection. Similar types of operations are performed to take down a call connection. These operations are advantageously carried out by well known data processing programmed manipulative functions in a way suited to the bidirectional storage crosspoint circuit as will be described in connection with FIG. 3.

NOP codes are required for reserving time slots in order to avoid interference between a call connection being set up and call connections already in use. It is convenient to search out and set up call connections in a sequence of steps; but because of the way that column control memories are organized and operated, such step-wise writing of equipment numbers into control memories would cause call interference unless a reservation technique were employed. It is also necessary, as will be shown, to write the NOP codes, for row and column circuits of different matrices to be connected, into row and column memories for those circuits in the same frame but to write equipment name codes, for row and column circuits to be connected within a single matrix, into row and column memories of that matrix in one time frame.

It is assumed that the equipment availability determination is initiated with the calling station time slot number $N_{42}$. This is the number utilized by the telephone set 42 on time division highway 50, which corresponds in the matrix 60 to the row circuit 11 of the matrix diagram in FIG. 1. It is also assumed that the illustrative space division path to be examined uses column circuit 16 of matrix 60 and extends through stage II matrix 70, time slot interchanging units 87 and 90, and group 53 matrices 73 and 65 to time division highway 51. Before actual time slot assignments are made in the control memories, the total space path is checked for time slot and crosspoint availability.

The first memory control to be considered is the memory 21 of matrix 60 since it controls input signal distribution for signals on the row circuit 11, to which highway 50 is connected. The calling station time slot $N_{42}$ is necessarily available in control memory 21 since that is the time slot being utilized by the calling station, and there is no need to impose a NOP code in that time slot in order to reserve the time slot in memory 21. It is necessary to check that the total number of occurrences of column address 16, in control memory 21, is smaller than the length used for each of the shift registers 30, 32, 36, 37; for, if it were not, the present connection could not be accomplished without destroying some other previously existing connection. In the event that the total count of column address 16 does equal the shift register length, a new space division path must be chosen and tried. In addition, it must be determined from the contents of control memory 26 that there is an unused time slot on column circuit 16; for if there is not, there are not enough time slots on circuit 16 to complete the proposed connection; and a new space division path must be chosen and tried. Also, the contents of control memory 21, associated with matrix 70, must be examined to determine that the total number of column circuit 17 addresses does not equal or exceed the shift register length, otherwise a new space division path must be chosen and tried. Similar availability checks are made for highways 87*a*, 90*a* and for link circuit 81 between matrices 65 and 73. Crosspoint availability in matrices 65 and 73 is also checked in a similar fashion.

Assuming that none of the prior reasons for retry for another space division path is valid, the earliest time slot which may be used for gating the data from a shift register such as 37, located at the crosspoint of row circuit 11 and column circuit 16 in matrix 60, may be determined by counting the number of occurrences of column address 16 in control memory 21 subsequent to time slot $N_{42}$. Call this count result "C". Next find the time slot of the Cth occurrence of the row address 11 in control memory 26, and then add to that time slot number one. The latest time slot that could be used is the time slot of the (C+1)th occurrence of row address 11 in control memory 26. Any time slot between and including the earliest and latest time slots may be used; call it "$N_1$". The contents of time slot $N_1$ of control memories 27 of matrix 60 and 21 of 70 are changed during the same frame so that time slot $N_1$ in both memories contains an NOP code. If time slot $N_1$ already contained all zeros, no change is necessary; otherwise a push down operation is carried out so that the previous contents of time slot $N_1$ are inserted into time slot word locations $N_1$+1 and that of $N_1$+1 into location $N_2$+2, etc. The time slot $N_1$ on link circuit 81 between matrices 60 and 70 is now reserved for future use in the connection between subscriber sets 42 and 43, and the reservation was made in a manner such that errors are not introduced into previously existing connections.

A time slot $N_2$ which may be used for gating data from a shift register, such as 37, located at the crosspoint determined by the intersection of row circuit 11 and column circuit 17 in matrix 70 is determined in an analogous manner to that previously described for the intersection of circuits 11 and 16 in matrix 60. In this case, however, the time slot $N_1$ is used as the input time slot to circuit 11 of matrix 70.

Now the contents of column control memory 27 of matrix 70 and the contents of the control memory of time slot interchanger 87–90 (not explicitly shown) are changed in the same frame so that the matrix 70 control memory 27 contains an NOP in time slot $N_2$; and the time slot interchanger interchanges time slot $N_2$ on highway 87*a* with an unused time slot on highway 90*a*. An unused time slot always exists on any highway at the end of frame time during which the contents of shift register 30 are transferred to 37 and contents of 32 to 36. That time slot is temporarily used in this process of setting up the call connection. As can be understood from the above description, the time slot $N_2$ is now reserved on connection 87$a$ between matrix 70 and time slot interchanger 87–90, that reservation being made without introducing errors into previous connections.

Next, starting with the information that time slot $N_{43}$ on highway 51 is to be connected to link circuit 81 between matrices 65 and 73, reading and writing of control memories associated with matrices 65 and 73 are carried out in a manner analogous to that just outlined for connecting time slot $N_{42}$ on highway 50 to highway 87$a$. Time slot $N_3$ on a circuit 81 between matrices 65 and 73 is now reserved.

Next, control memory 28 for colunn circuit 18 of matrix 73 is changed to reserve time slot $N_4$ on highway 90$a$; and in the same frame the control memory of time slot interchanger 87–90 is changed so that the contents of that time slot $N_4$ on highway 90$a$ is interchanged with the contents of time slot $N_2$ on highway 87$a$.

The following steps must be carried out (in any order or simultaneously to complete the connection between sets 42 and 43:

A. During one single frame time, the control memories 21 and 26 of matrix 60 have the NOPs in time slots $N_{42}$ and $N_1$ replaced by the column address 16 and the row address 11, respectively.

B. In a similar way in matrix 70, during one single frame time, the time slot word location $N_1$ of row control memory 21 is written with column address 17 and the time slot word location $N_2$ of column control memory 27 is written with row address 11.

C. Time slot location $N_{43}$ of control memory 23 in matrix 65 is written with column address 17; and during the same frame time, time slot location $N_3$ of control memory 27 is written with row address 13.

D. As is now clear from prior examples, time slot location $N_3$ of row control memory 22 of matrix 73 is commanded to contain column address 17; and time slot location $N_4$ of control memory 27 of matrix 73 is commanded during the same frame to contain row address 12.

It should be clear that even though the descriptions of steps A–D may differ in language, their effect is that of an analogous pattern; and the net result of steps A–D is to connect time slot $N_{42}$ on highway 50, through the illustrated network, to $N_{43}$ on highway 51.

When a call has been completed, central control detects the fact that one of the parties went on-hook and initiates a disconnect procedure. This procedure is similar to a reverse version of the connect procedure already described, but no blocking tests are required and no space path option determination is required. The space and time path of a call may be traced from either end by inspecting the contents of the control memories. The trace is started with the time slot number of the party found to have gone on-hook. For example starting with the time slot $N_{42}$ on highway 50, the contents of time slot $N_{42}$ of control memory 21 in matrix 60 are inspected to find which crosspoint along row circuit 11 is being used for the connection; say, for example, that it is the one at the intersection with column circuit 16. Count this occurrence of the equipment code, i.e., address, for circuit 16 and all subsequent identical codes in a frame; and call this result "C".

Then the contents of column control memory 26 of matrix 60 are scanned to find the time slot of the Cth occurrence of the code for row circuit 11. This is also the time slot used on row circuit 11 of matrix 70 and thus on like circuit 81 between matrices 60 and 70. The same method is used to trace the call through matrix 70 to get the number of the highway and the time slot used between matrix 70 and the time slot interchanger 80.

Given the time slot number used on one side of the interchanger, the contents of the control memory of the time slot interchanger are located and define the time slot used on its other side in accordance with the particular type of interchanger employed. Now the call may be traced through the remaining two matrices in a fashion similar to that described for the first two, and the completed trace has all the equipment and time slot numbers used in the present connection. The connection is then removed by overwriting with NOPs the equipment numbers in the row and column control memories associated with a crosspoint in a single matrix in a single frame time. This is then done for the other three matrices. The NOPs are then removed from, and the subsequent contents pulled up in, the control memories at both ends of a link connection or highway during another single frame time, for each connection highway involved.

Reference has been hereinbefore made to procedures for performing various operations on the contents of particular control memories of switching matrices and time slot interchanging units These operations include such things as scanning for certain codes stored therein or for vacant locations, counting certain code occurrences, pushing blocks of stored data up or down, and inserting or erasing codes in predetermined time slot locations of the memories. In all such operations, the control memory contents are advantageously copied into central processor temporary memory, processed there in accordance with the desired program subroutine, and, if necessary, returned to the memory for overwriting the old contents. Memory writing operations are herein described, with reference to FIG. 3, since they are the most difficult to handle in a system sense. The manner of performing the other operations follows readily from the description of the writing operation.

Figure 3:
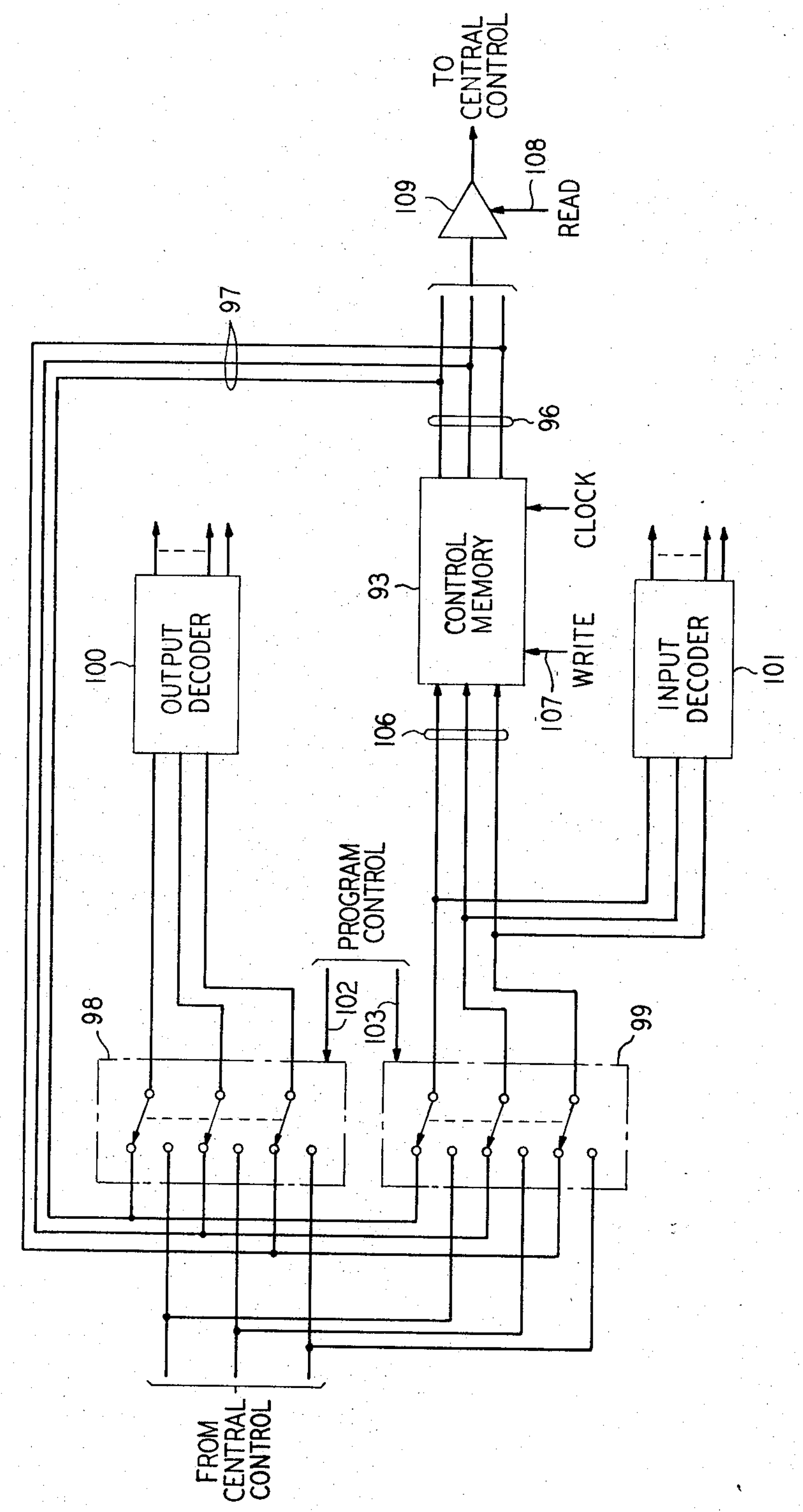
FIG. 3 is a block and line diagram of circuits for writing new information into control memories such as are employed in FIG. 1.

FIG. 3 illustrates control memory control circuits for handling the writing operations in one way which is deemed advantageous for stored program control systems having a central control for exerting the desired coordinating influence in the system. A control memory 93 represents any of the control memories hereinbefore mentioned and can take any form which is advantageous for a particular system; and two examples would be a loop shift register configuration or a memory including logic which is responsive to time slot clock signals for reading corresponding memory word locations onto memory digit circuits either destructively with write back or nondestructively.

In the preceding discussions of FIG. 1, the control memories are shown and discussed as including a single set of decoder output connections which are applied to shift command input connections, respectively, for different storage matrix crosspoint circuits. In each case the shift command connection to a crosspoint circuit was shown to be applied in multiple to an input shift register and an output shift register for such crosspoint circuit. However, in accordance with the control memory writing technique here considered, it is advantageous to utilize with each control memory, at least during memory writing operations, separate decoders for influencing crosspoint input and output shift registers, respectively, which are controlled by that memory.

Control memory 93 has a set of output circuits 96 for the digit circuits thereof, and signals on these circuits are applied by way of circuits 97 to selection switches 98 and 99 for application to an output decoder 100 and an input decoder 101, respectively. These decoders supply shift commands to output and input shift registers, respectively. The three circuits 96 will accommodate six equipment numbers plus the NOP code. Larger numbers of circuits can be used as may be required, and the number used may influence the memory writing technique selected for a particular case. Although switches 98 and 99 are schematically represented as triple-pole, double-throw switches, it is to be understood that each performs a function which is capable of being electronically produced, for example, by logic AND gates under the control of program signals supplied by circuits 102 and 103 from central control. Switches 98 and 99 are shown in their normal up position which is utilized during normal communication operations when no control memory writing function is taking place. Signals on circuits which interconnect the switch 99 to the input decoder 101 are also applied by way of a set of input circuits 106 to the digit circuits of control memory 93 when writing operations are taking place, as directed by a write control signal on a circuit 107.

Although control memory modification can be accomplished by specialized programmed logic as in the Marcus patent, it is here accomplished by normal programmed operations of conventional types in the central control data processor. To that end, the entire contents C(CM) of a control memory, that is to have the information in at least one word location altered, are advantageously copied to temporary memory in central control. This copying is accomplished by applying, for one time frame, a read control signal from central control to a circuit 108. That read signal enables read amplifiers, schematically represented by a single amplifier 109, to couple control memory output signals on the circuits 96 to central control. During this readout operation, and during the processing of the memory contents by central control, the contents of memory 93 continue to be used by the decoders 100 and 101 in the normal way.

It has been previously indicated that new information is in some cases written directly into a control memory word location without affecting other memory contents. This is the case, for example, with the row memories 21, 22, and 23 in stage I of FIG. 1. However, in other cases new information is inserted into a particular time slot word location, or removed from such a location; and memory contents in later time slot word locations are pushed down or up, respectively. Thus, the memory content modifying operation in central control must be able to affect as little as one word location or as much as nearly all word locations of the control memory.

Modification of the copy of control memory contents C(CM) within central control employs conventional logic operation techniques which are here briefly outlined. A primary time slot location is one determined during pathfinding to require change by receiving, or having erased therefrom, the name of equipment used in a particular call connection under consideration. A secondary time slot location is one that must have its contents shifted to another location as a result of a change being made in a primary location.

When only primary locations are to be altered, central control achieves the result either by overwriting at each discrete primary address or by a combinatorial logic operation performed on at least a portion of the contents C(CM) including the primary location. If a writing operation requires shifting of secondary location information to push it down or up in the time slot sequence of a frame, other, such as well-known subroutines for character shifting, are employed. When modifications of the contents C(CM) in the temporary memory have been completed, they are returned to control memory 93.

At the beginning of a time frame during which the modified contents of the control memory 93 are to be transferred back to that memory from central control, program control signals on circuits 102 and 103 determine the arrangement for selection switches 98 and 99 and a control signal for circuit 107 enables input gates in the memory 93 to couple signals from input circuits 106 to the respective memory word locations. During a writing operation in which a NOP code is written to reserve a certain primary word location, and all other following time slot location contents have been pushed down by one time slot, switches 98 and 99 are operated to their down positions so that they couple the modified memory content information from central control directly to the output and input decoders 100 and 101 and to the input connections 106 of control memory 93. However, when a NOP code is to be replaced by a code representing an equipment number to set up a call connection, or conversely when an equipment number is to be replaced by a NOP code to take down a call connection, switch 98 is operated to its upper position; and switch 99 is operated to its lower position for the duration of the time frame required to rewrite control memory 93.

When switch 98 is up and switch 99 is down, the output decoders are temporarily, for one frame, isolated from the new information and continue to couple the old control memory output signal information from circuits 97 to the output decoder 100 for generataing appropriate shift commands to crosspoint output shift registers. In the meantime, the new information from central control is applied through switch 99 to overwrite the contents of control memory 93 in successive time slot steps. These game writing signals from central control are also utilized by input decoder 101 for generating appropriate shift commands to crosspoint input shift registers. At the end of the overwriring time frame, switches 98 and 99 are both restored to their normal upper positions to enable normal control memory operation. The particular switch configuration utilized, as just described for entering a modified set of equipment numbers into memory 93, allows the crosspoint shift registers to continue operation on old information for output shift registers in order to clear the crosspoint of the final time slot bits of calls in progress and being completed so that there is no interference between successive call connections utilizing any particular equipment units. This arrangement is made necessary by the fact that there is approximately one frame of signal delay in signal transmission through the shift registers of a cross-point circuit.

Although the present invention has been described in connection with particular applications and embodiments thereof, it is to be understood that modifications and additional applications and embodiments which will be apparent to those skilled in the art are included within the spirit and scope of the invention.

What is claimed is:

1. In a time division multiplex switching matrix crosspoint circuit for controllably coupling signals between a row coordinate circuit and a column coordinate circuit of the matrix, the improvement comprising
   input register means for receiving signals from at least one of said coordinate circuits in selected time slots of a time division multiplex signal frame,
   output register means for transmitting signals to at least one of said coordinate circuits in selected time slots of a time division multiplex signal frame, and
   means for transferring the contents of said input register means to said output register means at only the end of each signal frame.

2. The crosspoint circuit in accordance with claim 1 in which
   said row coordinate circuit comprises first bidirectional circuit means,
   said column coordinate circuit comprises second bidirectional circuit means,
   means are provided for coupling selectable incoming signals from said first and second bidirectional circuit means to first and second parts of aid input register means, respectively,
   means are provided for coupling outgoing signals from first and second parts of said output register means to said first and second bidirectional circuit means, respectively, and
   means are further provided for controlling both of said coupling means to cause said first part of said input register means to be slaved in operating time with said first part of said output register means, and to cause said second part of said input register means to be slaved in operating time with said second part of said output register means.

3. The crosspoint circuit in accordance with claim 2 in which
   said parts of said input and output register means are individual shift registers.

4. The crosspoint circuit in accordance with claim 2 in which said controlling means comprises
   a plurality of control memories each having one word storage location for each time slot of a frame,
   a first one of said memories having stored in at least one of its time slot word locations first signals identifying said switching crosspoint circuit,
   a second one of said memories having stored in at least one of its time slot word locations second signals identifying said switching crosspoint circuit, and
   means for coupling said first and second signals to actuate said first parts of said incoming signal coupling means and outgoing signal coupling means and to actuate said second parts of said incoming and outgoing signal coupling means, respectively.

5. In a time division switching system for operating in accordance with time base signals defining a plurality of time slots in a repetitive time cycle,
   a matrix having time-multiplexed row circuit pairs and column circuit pairs,
   bilateral crosspoint devices for coupling each of said row circuit pairs to each of said column circuit pairs,
   means for separately storing signals received from said row circuit pairs and from said column circuit pairs in said crosspoint devices during time slots of a first cycle, and
   means, operative in a second cycle, for transferring the stored signals from a first plurality of said devices, at different ones of said row circuit pairs, to one of said interconnected column pairs and from a second plurality of said devices, at different ones of said column circuit pairs, to one of said interconnected row circuit pairs.

6. A bidirectional switching matrix comprising
   a plurality of crosspoint circuits,
   a first set of matrix coordinate circuits,
   a second set of matrix coordinate circuits arranged to be selectably coupled to respective first set circuits through corresponding selectable ones of said cross-point circuits,
   within each of said first and second sets of coordinate circuits the circuits are arranged in pairs with one circuit of each pair comprising an input circuit with respect to matrix crosspoint circuits to which it is connected and the other circuit of each pair comprising an output circuit with respect to the matrix crosspoint circuits to which it is connected, and
   buffer storage register means in each of said crosspoint circuits for providing bidirectional signal coupling between one of said circuit pairs of said first set and a circuit pair of said second set.

7. The switching matrix in accordance with claim 6 in which said storage register means comprises
   input register means connected in each of said crosspoint circuits to receive signals from said input circuits,
   output register means connected in each of said crosspoint circuits to apply signals to said output circuits, and
   a separate control memory corresponding to each of said matrix coordinate circuits, each said memory comprising
   time slot word storage locations for storing control signals corresponding to each time slot of a time division signal frame,
   circuit means for supplying control signals for storage in said memory,
   first and second control switch means,
   means for coupling control memory output by way of said first and second control switch means to said input and output register means, respectively, in the respective crosspoint circuits connected to its corresponding matrix coordinate circuit,
   said first and second control switch means including means operable for coupling to the respective register means signals from either said word storage locations or said supplying circuit means,
   means for coupling to an input of the control memory said first control switch means output, and
   means for operating said control switch means to couple control signals from said memory through said second switch means while coupling control signals from said supplying means through said first switch means to said control memory input for overwriting the contents of said time slot word storage locations.

8. The matrix in accordance with claim 6 in which said register means in each crosspoint circuit comprises
first shift register means for providing signal coupling from an input circuit of said first set pair of circuits to an output circuit of said second set pair of circuits, and
second shift register means for providing signal coupling from an input circuit of said second set pair of circuits to an output circuit of said first pair of circuits.

9. The switching matrix in accordance with claim 8 in which
said first shift register means comprises a first input shift register and a first output shift register,
said second shift register means comprises a second input shift register and a second output shift register,
first means are provided for operating said first input and second output shift registers in the same time slots of recurring time frames, and
second means are provided for operating said second input and first output shift registers in the sane time slots of recurring time frames.

10. The switching matrix in accordance with claim 9 in which there are provided
means for transferring signals from said first input shift register to said first output shift register and from said second input shift register to said second output shift register at the end of each of said time frames.

11. The switching matrix in accordance with claim 9 in which said means for operating said shift registers comprises
a separate control memory for each pair of first set coordinate circuits and connected for enabling the coupling of signals in the input circuit of such pair to predetermined selected ones of said first input shift registers at crosspoints connected to such input circuit,
means for further coupling the output of each of said control memories to control similarly and simultaneously the application of signals from said second output shift registers to the output circuit of the same first set circuit pair,
a separate control memory for each pair of second set coordinate circuits connected for applying signals in the input circuit of such pair to predetermined selected ones of said second input shift registers at crosspoints connected to such input circuit,
means for further coupling the output of each of the last-mentioned control memories to control similarly and simultaneously the application of signals from said first output shift registers to the output circuit of the same second set circuit pair,
each of said control memories includes one word location for each time slot of a time frame and has stored therein signals identifying respective crosspoint circuits to be connected to corresponding matrix coordinate circuits in such time slots, and
means recurrently reading out the contents of said control memories in word-series sequence at the time slot recurrence rate.

12. A time division multiplex communication system comprising
a plurality of bidirectional, storing crosspoint, switching stages each of which includes at least one bidirectional switching matrix, each of said stages having a first set of receiving and output connections and a second set of receiving and output connections,
means for coupling said stages in predetermined tandem sequence including a first and a final bidirectional switching stage, said coupling means including means for connecting said second set receiving and output connections of a stage to said first set output and receiving connections, respectively, of a following stage in each sequence,
means for applying a plurality of time division multiplex signals to said first set of receiving connections of said first stage, and
means for receiving signals from said first set of output connections of said first stage, and
time slot interchanging means for coupling said second set of output connections of said final stage in said sequence to said second set of input connections in the same stage.

13. A time division multiplex communication system comprising
a plurality of bidirectional switching stages each of which includes at least one bidirectional switching matrix, each of said stages having a firset set of receiving and output connections and a second set of receiving and output connections, each of said matrices including controlled signal storage means at matrix crosspoints thereof for providing buffer storage coupling between said first and second sets of receiving and output connections,
means for coupling said stages in predetermined tandem sequence including a first and final bidirectional switching stage,
means for applying a plurality of time division multiplex signals to said first set of receiving connections of said first stage,
means for receiving signals from said first set of output connections of said first stage, and
means for coupling said second set of output connections of said final stage in said sequence to said second set of input connections of the same stage.

14. A method for establishing signal communication connections through a multistage time division multiplex switching network wherein successive switching equipments are activated by outputs of recurrently interrogated control memories, said method comprising the steps of
identifying at least one possible space division path through said network,
determining time slot availability of successive equipments in said path for establishing time division multiplex signal communication therethrough,
storing a no-operation signal code in control memory locations for respective ones of said equipments to reserve such time slots without identifying such equipments, and
overwriting said control memory locations containing said no-operation codes to store therein corresponding respective equipment numbers for establishing communication in said path.

15. The method in accordance with claim 14 in which said network includes a plurality of crosspoint switching matrices having row and column circuits and wherein respective row control memories and column control memories provide signals for selecting interconnecting crosspoint circuits, and said no-operation codes storing step is accomplished by writing each row control memory in the same time frame that the code is written in the column control memory of a connecting matrix column of a previous stage, if any, and said step of overwriting said equipment numbers into said control memories is accomplished by writing such numbers in control memories of row and column matrix circuits which are to be interconnected in any given matrix in the same time frame.

* * * * *